(12) United States Patent
Odagiri

(10) Patent No.: US 10,207,409 B2
(45) Date of Patent: Feb. 19, 2019

(54) IMAGE PROCESSING METHOD, IMAGE PROCESSING DEVICE, AND ROBOT SYSTEM

(71) Applicant: CANON KABUSHIKI KAISHA, Tokyo (JP)

(72) Inventor: Jun Odagiri, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 70 days.

(21) Appl. No.: 14/883,033

(22) Filed: Oct. 14, 2015

(65) Prior Publication Data

US 2016/0110840 A1    Apr. 21, 2016

(30) Foreign Application Priority Data

Oct. 16, 2014    (JP) .................................. 2014-211412

(51) Int. Cl.
G06K 9/00    (2006.01)
B25J 9/16    (2006.01)
G06K 9/62    (2006.01)
G06T 7/73    (2017.01)
(Continued)

(52) U.S. Cl.
CPC .............. B25J 9/1697 (2013.01); G06K 9/48 (2013.01); G06K 9/6204 (2013.01); G06T 7/13 (2017.01); G06T 7/74 (2017.01); G05B 2219/39391 (2013.01); G05B 2219/39393 (2013.01);
(Continued)

(58) Field of Classification Search
CPC ........ G01S 13/888; G01S 13/89; G01S 7/412; G01S 5/30; G05D 1/0246; G05D 1/0253

USPC ....... 382/153, 209, 266, 279, 282, 291, 307; 700/245, 248, 261
See application file for complete search history.

(56) References Cited

U.S. PATENT DOCUMENTS 6,763,125 B2 *   7/2004   Ohta .................. G06K 9/00798
                                                            340/907
6,898,316 B2 *   5/2005   Zhou .................... H04N 1/3872
                                                            358/450

(Continued)

FOREIGN PATENT DOCUMENTS

| JP | 2010-97438 A | 4/2010 |
| JP | 2010097341 A | 4/2010 |
| JP | 2014059592 A | 4/2014 |

*Primary Examiner* — Yosef Kassa
(74) *Attorney, Agent, or Firm* — Canon U.S.A., Inc. IP Division

(57) ABSTRACT

An image processing method can suppress detection accuracy of a detection target object from being lowered even if the detection target object has a different surface condition because of the influence of various kinds of noise. The image processing method includes the following operations of generating a captured model edge image by executing edge extraction processing on a captured model image acquired by capturing a detection target object, executing pattern matching of the captured model edge image and a model edge image, calculating similarity at respective edge points in the model edge image in the pattern matching of the captured model edge image and the model edge image, selecting an edge point to be eliminated based on the similarity from among the respective edge points in the model edge image, and generating an edge image acquired by eliminating the selected edge point as a final model edge image.

17 Claims, 9 Drawing Sheets

(51) Int. Cl.
*G06T 7/13* (2017.01)
*G06K 9/48* (2006.01)

(52) U.S. Cl.
CPC ............ *Y10S 901/02* (2013.01); *Y10S 901/28* (2013.01); *Y10S 901/47* (2013.01)

(56) References Cited

U.S. PATENT DOCUMENTS

| | | | | |
|---|---|---|---|---|
| 6,937,761 B2 * | 8/2005 | Thomas | ............... | G06T 7/11 382/164 |
| 7,038,577 B2 * | 5/2006 | Pawlicki | ............ | B60K 31/0008 340/435 |
| 7,146,057 B2 * | 12/2006 | Clark | ............... | G06K 9/48 382/242 |
| 7,292,263 B2 * | 11/2007 | Segelke | ............ | G02B 21/365 348/79 |
| 7,409,092 B2 * | 8/2008 | Srinivasa | ............ | G06K 9/3241 382/103 |
| 7,672,507 B2 * | 3/2010 | Fan | ............... | G06T 7/12 382/162 |
| 7,679,498 B2 * | 3/2010 | Pawlicki | ............ | B60K 31/0008 340/435 |
| 8,014,590 B2 * | 9/2011 | Lee | ............... | G06K 9/38 382/155 |
| 8,050,509 B2 * | 11/2011 | Jeong | ............... | G06K 9/40 382/254 |
| 8,086,020 B2 * | 12/2011 | Chang | ............... | G01N 21/94 382/141 |
| 8,120,679 B2 * | 2/2012 | Ishiga | ............... | G06T 5/002 348/241 |
| 8,155,473 B2 * | 4/2012 | Kido | ............... | G06T 1/00 382/232 |
| 8,253,829 B2 * | 8/2012 | Kawashima | ............ | G06T 5/002 348/246 |
| 8,358,307 B2 * | 1/2013 | Shiomi | ............... | G06T 3/40 345/428 |
| 8,363,728 B2 * | 1/2013 | Zhang | ............... | H04N 19/176 375/240.08 |
| 8,401,305 B2 * | 3/2013 | Kido | ............... | G06K 9/6253 382/199 |
| 8,406,527 B2 * | 3/2013 | Kido | ............... | G06K 9/6202 382/189 |
| 8,593,335 B2 * | 11/2013 | Nakagawa | ............ | G01S 7/22 342/145 |
| 8,649,592 B2 * | 2/2014 | Nguyen | ............... | G06K 9/38 345/419 |

* cited by examiner

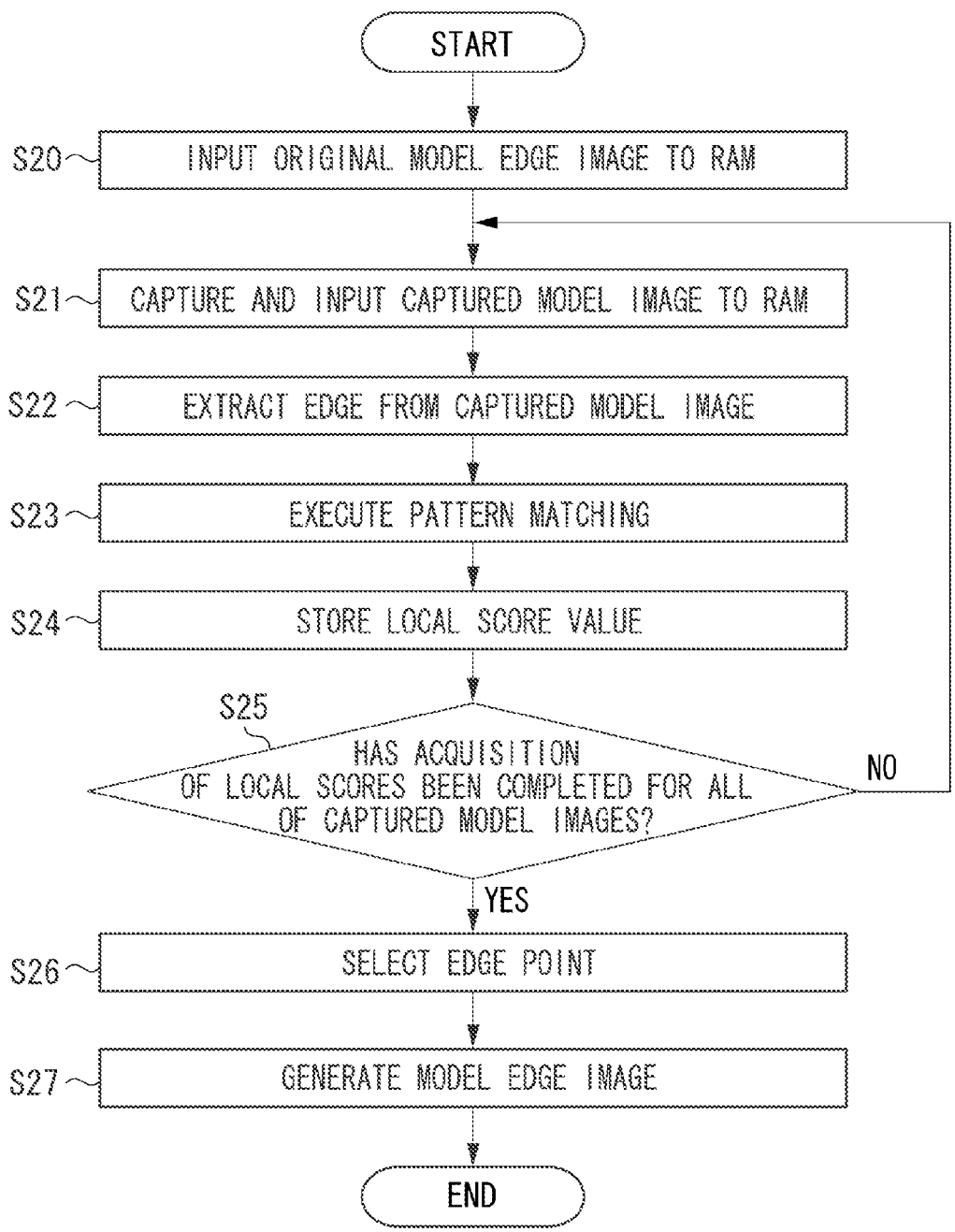

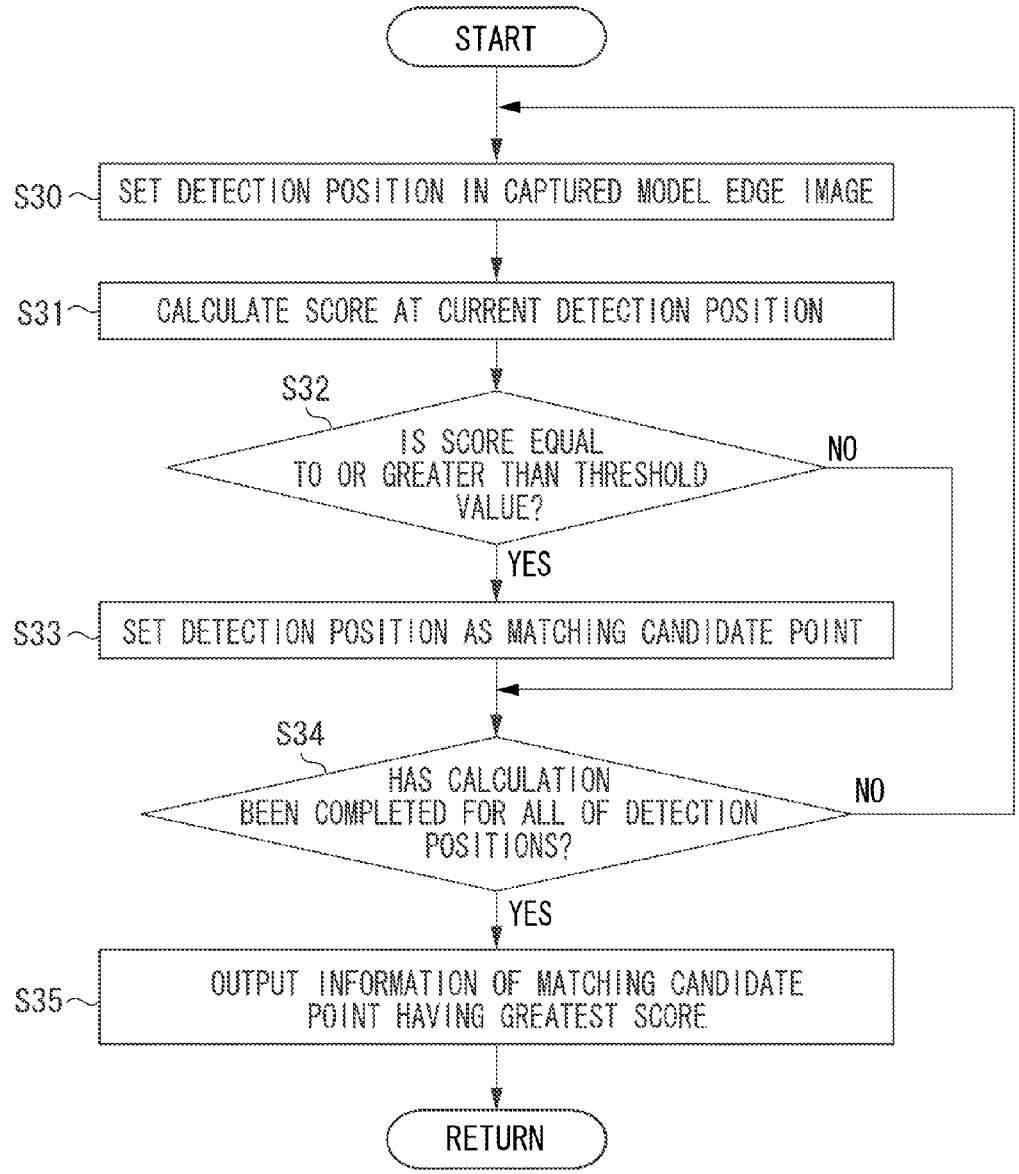

IMAGE PROCESSING METHOD, IMAGE PROCESSING DEVICE, AND ROBOT SYSTEM

BACKGROUND OF THE INVENTION

Field of the Invention

The present invention relates to an image processing method in which a model edge image that is generated based on a detection target object used for pattern matching is used as a final model edge image. Further, the present invention also relates to an image processing device and a robot system.

Description of the Related Art

Conventionally, in a field of image processing, a pattern matching method has been known as a method for detecting a position and an orientation of a detection target object such as a work. In particular, a method known as shape pattern matching (hereinafter, referred to as "pattern matching") has been widely employed because the method has high robustness in terms of variations in illumination and an object with a hidden or void portion.

In the pattern matching, because a similarity is calculated by using shape characteristics of a model (i.e., reference image) and a search image of a detection target object, it is necessary to extract the shape characteristics of the detection target object from the images. Generally, an edge extraction method such as the Sobel filter or the Canny filter is known as the method for extracting the shape characteristics. Therefore, there has been known a calculation method in which the above-described edge extraction method is applied to a model and a search image to generate a model edge image and a search edge image to calculate the similarity between the model edge image and the search edge image.

However, in practice, because of influence of the noise such as dust or dirt adhering thereto, variations in illumination, or individual variability, the detection target object may have a surface condition different from the ideal surface condition. Therefore, a position and an edge direction may be different at an edge point of the detection target object in the search image and an edge point of the model. In particular, because the similarity is lowered when the position and the edge direction are significantly different at the edge point of the detection target object in the search image and the edge point of the model, the detection target object may be mistakenly determined to have low similarity. Therefore, there arises a problem in that detection accuracy of the detection target object is lowered.

Japanese Patent Application Laid-Open No. 2010-97438 discusses a method for generating a model edge image based on a model. In the method, a long edge that is deemed less influenced by the noise is kept while a short edge that can be considerably influenced by the noise is eliminated in generating a model edge image. According to the above-described generation method of the model edge image, the similarity can be prevented from being lowered and the detection accuracy of the detection target object can be improved in comparison to the case where the similarity is determined by using a model edge image that is generated without using the above-described generation method.

However, according to the generation method of the model edge image described in Japanese Patent Application Laid-Open No. 2010-97438, determination on whether to eliminate the edge point is simply made based on a length of the edge. Therefore, for example, in a case where an edge has a short length, the edge is eliminated even if the edge is not influenced by the noise, so that the similarity is lowered. Therefore, there is a problem in that detection accuracy of the detection target object is lowered. On the other hand, in a case where an edge has a long length, the edge is not eliminated even if the edge is influenced by the noise, so that the similarity thereof is lowered. Therefore, there is a problem in that detection accuracy of the detection target object is lowered.

SUMMARY OF THE INVENTION

According to an aspect of the present invention, an image processing method includes generating a captured model edge image by executing edge extraction processing on a captured model image acquired by capturing a detection target object, executing pattern matching of the captured model edge image and a model edge image related to the detection target object, calculating similarity at respective edge points in the model edge image in the pattern matching, selecting an edge point to be eliminated based on the similarity from among the respective edge points in the model edge image, generating an edge image acquired by eliminating the selected edge point as a final model edge image, and executing pattern matching of the final model edge image and a search edge image related to a search image acquired by capturing a search object.

According to the present invention, of the edge points in a model edge image, an elimination-target edge point is selected based on the similarity, and an edge image acquired by eliminating the selected edge point is generated as a model edge image. Therefore, even if the detection target object has a different surface condition because of the influence of various kinds of noise, detection accuracy of the detection target object can be suppressed from being lowered. Further, pattern matching of the model edge image and a search edge image can be executed with high accuracy by suppressing the lowering of detection accuracy of the detection target.

Further features of the present invention will become apparent from the following description of exemplary embodiments with reference to the attached drawings.

BRIEF DESCRIPTION OF THE DRAWINGS

FIG. 1A is a side view of the entire robot system, FIG. 1B is a plan view of a work held by a hand, and FIG. 1C is a captured image of the work held by the hand illustrated in FIG. 1B.

FIG. 5A is a diagram illustrating a reference image in which a clip image is clipped out, FIG. 5B is a diagram illustrating a vector of one pixel, and FIG. 5C is a diagram illustrating a model edge image generated from the clip image.

FIG. 6 is a flowchart illustrating the processing that is to be executed when a model edge image is generated by the model edge image generation unit according to a present exemplary embodiment.

FIG. 7 is a flowchart illustrating the processing of pattern matching that is to be executed when a model edge image is generated by the model edge image generation unit according to a present exemplary embodiment.

DESCRIPTION OF THE EMBODIMENTS

Hereinafter, an exemplary embodiment embodying the present invention will be described in detail with reference to the appended drawings.

Figure 1A:
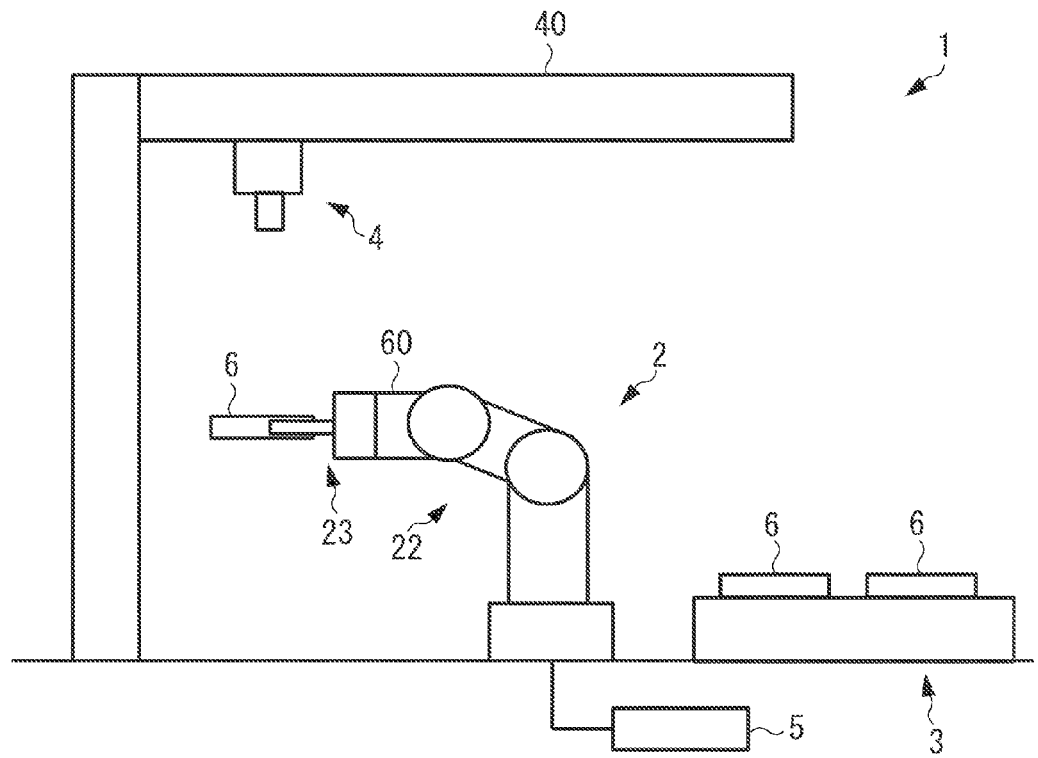
FIGS. 1A, 1B, and 1C are diagrams illustrating a general configuration of a robot system according to a present exemplary embodiment.

As illustrated in FIG. 1A, a robot system 1 is configured of a robot main body 2, a camera 4, and a control device 5 of the robot main body 2, and the control device 5 includes an image processing device having a model edge image generation unit and a pattern matching unit. The model edge image generation unit and the pattern matching unit may be respectively configured of hardware, or may be configured of software as a part of the control device 5.

In the present exemplary embodiment, the robot system 1 includes a work supply device 3 that supplies a work 6 (i.e., detection target object) to the robot main body 2.

Figure 1B:
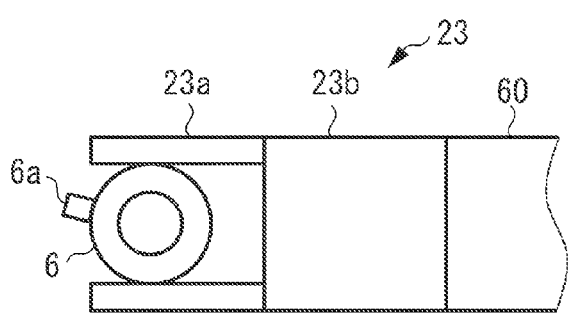
Figure 1C:
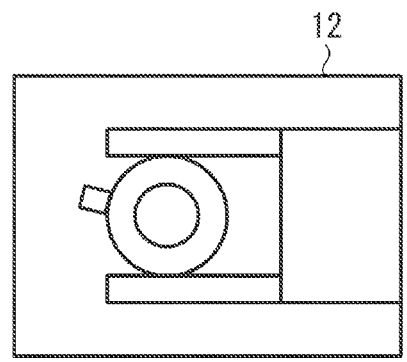
Figure 5A:
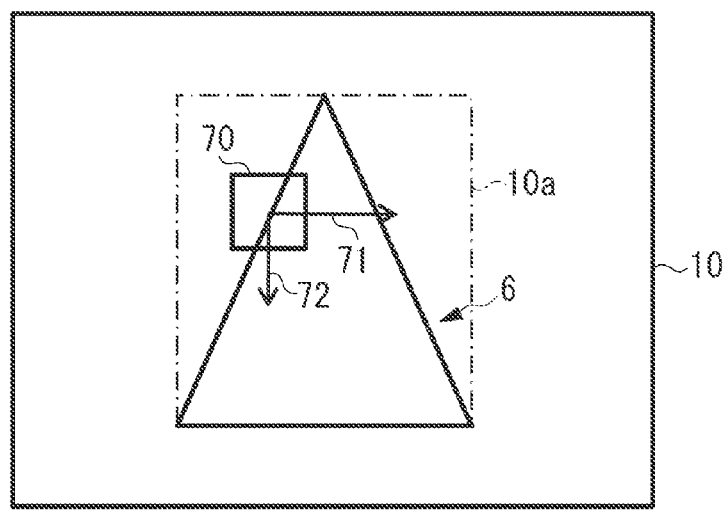
FIGS. 5A, 5B, and 5C are diagrams illustrating processing for generating a model edge image according to a present exemplary embodiment.

The robot main body 2 can operate the work 6, and the control device 5 controls the robot main body 2 and the camera 4. As illustrated in FIG. 1B, for example, the work 6 is formed into a circular-ring shape, a part of which has a projection 6a externally projected in a diameter direction as a phase reference. Herein, although the phase reference of the work 6 is represented by the projection 6a, the phase reference is not limited to the above, for example, a mark may be used as the phase reference. The camera 4 is fixed onto a camera fixing base 40, so that an image of the work 6 supplied to the robot main body 2 from the work supply device 3, i.e., the work 6 gripped by a hand 23, can be captured by the camera 4 from above. For example, as illustrated in FIG. 1C, a search image 12 can be acquired when the work 6 and its periphery are captured as a search object. In addition, the work 6 can be formed into any shape. Hereinafter, in order to describe the present exemplary embodiment with ease, the work 6 is formed into a triangular-prism shape as illustrated in FIG. 5A.

The robot main body 2 includes a 6-axis vertical multi-joint arm (hereinafter, referred to as "arm") 22 and the hand 23 serving as an end effector.

The hand 23 is attached to and supported by a leading-edge link 60 of the arm 22, so that at least one degree of freedom of a position and an orientation thereof can be adjusted according to the operation of the arm 22. The hand 23 includes two fingers 23a and a hand main body 23b that supports the fingers 23a and enables the fingers 23a to increase or decrease the space therebetween, so that the hand 23 can hold the work 6 by moving the fingers 23a close together. In the present exemplary embodiment, the hand 23 is employed as an end effector. However, the end effector is not limited to the above, and any tools capable of holding the work 6 can be employed therefor.

Figure 2:
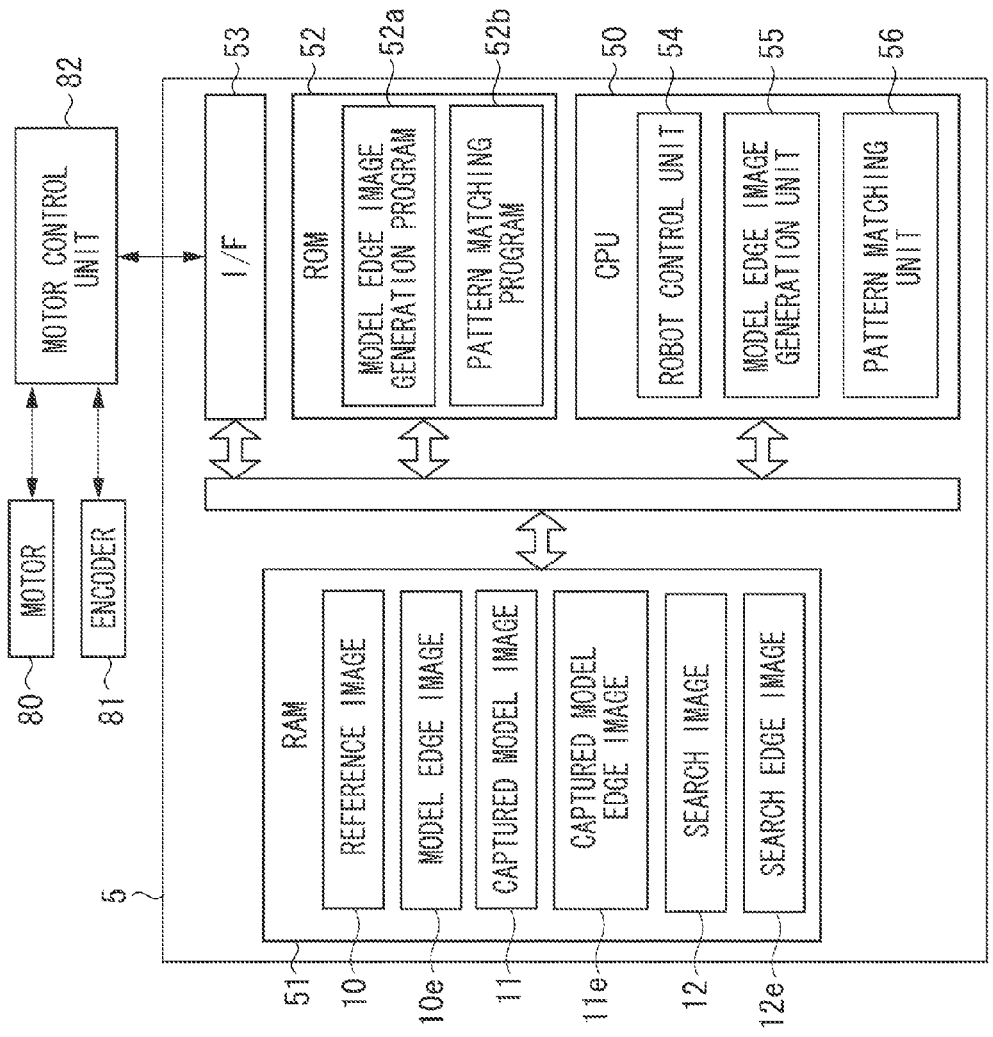
FIG. 2 is a block diagram illustrating a control device according to a present exemplary embodiment.

For example, the arm 22 includes seven links and six joints that swingably or rotatably connect respective links to each other. Links having fixed lengths are employed for the respective links. However, for example, a link that is extensible and retractable with a linear actuator may be also employed therefor. As illustrated in FIG. 2, each of the joints includes a motor 80 for driving the joint, an encoder 81 for detecting a rotation angle of the motor 80, and a motor control unit 82 for transmitting and receiving a signal to/from the control device 5 to control the motor 80 and the encoder 81. In the present exemplary embodiment, the 6-axis vertical multi-joint arm is employed as the arm 22. However, a number of axes may be changed as appropriate according to the usage or purpose.

The control device 5 is configured of a computer in order to control the robot main body 2. The control device 5 includes a central processing unit (CPU) 50 serving as a calculation unit, a random access memory (RAM) 51 serving as a storage unit capable of temporarily storing data, a read only memory (ROM) 52 for storing a program for controlling respective units, and an input/output interface (I/F) circuit 53 that enables the control device 5 to communicate with the robot main body 2.

Further, the control device 5 functions as a model edge image generation unit for generating a model edge image 10e as well as functioning as a pattern matching unit for executing pattern matching. In other words, the model edge image generation unit according to the present exemplary embodiment is configured of the RAM 51 capable of storing the model edge image 10e and the CPU 50 for generating the model edge image 10e. Further, the pattern matching unit according to the present exemplary embodiment is configured of the RAM 51 capable of storing at least a search edge image 12e and the model edge image 10e and the CPU 50 for executing pattern matching of the search edge image 12e and a final model edge image. Furthermore, in the present exemplary embodiment, although the control device 5 includes respective functions of the model edge image generation unit and the pattern matching unit, the model edge image generation unit and the pattern matching unit may be provided separately from the control device 5.

The ROM 52 stores below-described programs such as a model edge image generation program 52a, a pattern matching program 52b, a robot control program for controlling the operation of the robot main body 2, and an arithmetic program relating to the calculation of a positional orientation of the work 6 executed by the CPU 50. Unless the CPU 50 writes or deletes data, the data stored in the ROM 52 can be saved therein even if the power of the control device 5 is turned off. The RAM 51 temporarily stores the below-described data such as a reference image 10, a model edge image 10e of the reference image 10, a captured model image 11, an edge image of the captured model image 11 (i.e., captured model edge image 11e), a search image 12, and an edge image of the search image 12 (i.e., search edge image 12e).

The CPU 50 includes a robot control unit 54 for controlling an operation of the robot main body 2, a model edge image generation unit 55, and a pattern matching unit 56. The robot control unit 54 executes the robot control program to control the operation of the robot main body 2.

While details will be described below, the model edge image generation unit 55 executes the model edge image generation program 52a to generate the model edge image 10e before executing the pattern matching of the model edge image 10e and the search edge image 12e related to the work 6.

Specifically, the model edge image generation unit 55 executes processing for extracting an edge from the captured model image 11 acquired by capturing the work 6 to generate the captured model edge image 11e. Then, the model edge image generation unit 55 executes the pattern matching of the captured model edge image 11e and the model edge image 10e. Further, the model edge image generation unit 55 calculates similarity at respective edge points in the model edge image 10e when the pattern of the captured model edge image 11e matches the model edge image 10e. Then, of the respective edge points in the model edge image 10e, the model edge image generation unit 55 selects an edge point that is to be eliminated based on the similarity, and generates an edge image acquired by eliminating the selected edge point as a final model edge image.

While details will be described below, the pattern matching unit 56 executes the pattern matching program 52b to execute the pattern matching of the search edge image 12e and the final model edge image.

Specifically, the pattern matching unit 56 executes the pattern matching of the final model edge image related to the work 6 and the search edge image 12e related to the search image 12 that is acquired by capturing the work 6. Herein, the final model edge image is generated by the above-described model edge image generation unit 55.

Figure 3:
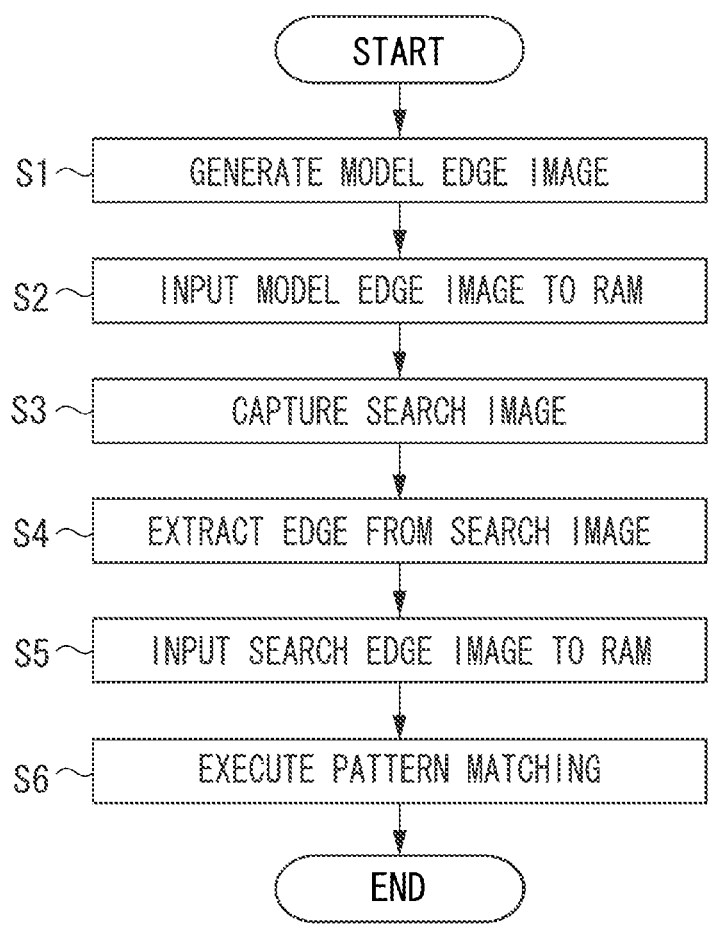
FIG. 3 is a flowchart illustrating processing of pattern matching executed by a pattern matching unit according to a present exemplary embodiment.

Subsequently, pattern matching of the work 6 executed by the above-described control device 5 of the robot main body 2 will be described with reference to the flowchart in FIG. 3. Herein, a processing flow will be briefly described, and the processing in respective steps will be described below in detail.

First, in step S1, the model edge image generation unit 55 uses the robot system 1 to capture the work 6 under various conditions to acquire the captured model image 11, and generates a final model edge image from the original model edge image 10e. The processing for generating the final model edge image will be described below.

Then, in step S2, the model edge image generation unit 55 inputs the generated final model edge image to the RAM 51. Then, in step S3, the pattern matching unit 56 uses the robot system 1 to capture the search image 12 including the work 6. Further, in step S4, the pattern matching unit 56 extracts an edge from the search image 12. In step S5, the pattern matching unit 56 inputs the search edge image 12e acquired from the search image 12 to the RAM 51.

Then, in step S6, the pattern matching unit 56 executes the pattern matching of the final model edge image and the search edge image 12e stored in the RAM 51. The CPU 50 can detect a position and an orientation of the work 6 based on the result of the pattern matching, so that the robot main body 2 can be controlled as appropriate based on that detection result.

Next, the processing for generating the model edge image 10e executed in step S1 will be described in detail with reference to the flowcharts in FIGS. 4, 6, 7, and 9. In the present exemplary embodiment, the model edge image 10e as an original is firstly generated (see FIG. 4), so that the final model edge image is generated based on the original model edge image 10e (see FIG. 6). Herein, a configuration will be described in which the model edge image 10e is generated by using the camera 4 and the control device 5 according to the present exemplary embodiment. However, the configuration is not limited to the above, and another camera or computer may be used therefor. Further, in the present exemplary embodiment, although the original model edge image 10e is generated based on the image captured by the camera 4, the configuration is not limited thereto. For example, CAD (computer-aided design) data to which an artificial edge is applied may be used therefor.

Figure 4:
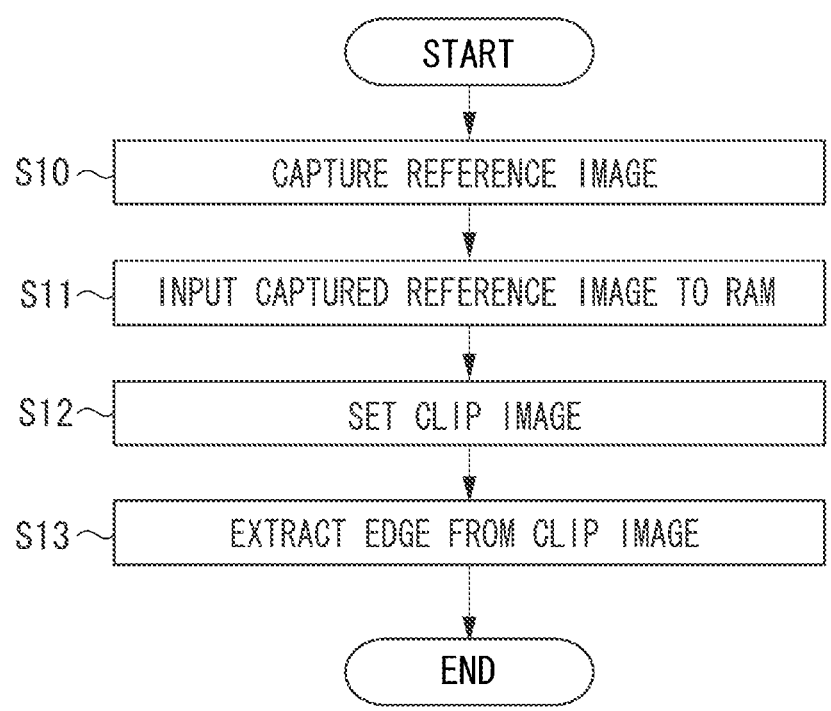
FIG. 4 is a flowchart illustrating the processing for generating an original model edge image executed by a model edge image generation unit according to a present exemplary embodiment.

As illustrated in FIG. 4, in step S10, in order to prepare the original reference image 10, the work 6 is placed on the ideal positional orientation under the ideal illumination condition, and an image of the work 6 is captured by the camera 4. In step S11, the model edge image generation unit 55 inputs the reference image 10 (see FIG. 5A) captured by the camera 4 to the RAM 51. The model edge image generation unit 55 displays the reference image on a display monitor (not illustrated), so that an operator sets a rectangular region in a periphery of the work 6 as a detection-target. In order to set the rectangular region, as illustrated in FIG. 5A, the operator uses a mouse (not illustrated) provided on the control device 5 to click two points at the upper left and the lower right of a region that includes the work 6 in the reference image 10 displayed on the display monitor. In step S12, by making the two clicked-points as the upper left and the lower right corners of the rectangular region, only the rectangular region is clipped from the reference image 10 as a clip image 10a.

Figure 5B:
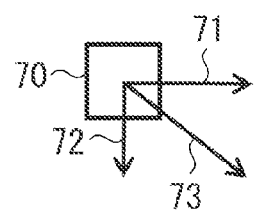

The model edge image generation unit 55 calculates a gradient magnitude and a gradient direction of luminance at each pixel of the clip image 10a. The gradient magnitude is calculated by using the Sobel filter in an x-axis direction and a y-axis direction. First, as illustrated in FIG. 5A, the model edge image generation unit 55 respectively calculates a gradient magnitude 71 in an x-axis direction and a gradient magnitude 72 in a y-axis direction at a target pixel 70. Then, as illustrated in FIG. 5B, the model edge image generation unit 55 calculates a gradient magnitude 73 of the target pixel 70 as a square root of a summation of the squared gradient magnitudes 71 and 72 in the x-axis direction and the y-axis direction. At this time, the gradient magnitude 73 can be acquired through the following formula 1.

$$E=\sqrt{E_x^2+E_y^2} \qquad \text{<Formula 1>}$$

In the above, "E" represents a gradient magnitude, "$E_x$" represents a gradient magnitude in the x-axis direction, and "$E_y$" represents a gradient magnitude in the y-axis direction.

At this time, a gradient direction θ is calculated through the following formula 2 by using the gradient magnitude $E_x$ in the x-axis direction and the gradient magnitude $E_y$ in the y-axis direction.

$$\theta = \tan^{-1}\left(\frac{E_y}{E_x}\right) \qquad \text{<Formula 2>}$$

In the above, "θ" represents a gradient direction.

After calculating the gradient magnitude E and the gradient direction θ of all of the pixels in the clip image 10a, in step S13, the model edge image generation unit 55 extracts a pixel having the gradient magnitude E equal to or greater than a predetermined threshold value as an edge, and generates the original model edge image 10e. Herein, "edge" is a pixel having the gradient magnitude E equal to or greater than a predetermined threshold value. Hereinafter, for descriptive purpose, a coordinate, a gradient magnitude, and a gradient direction of the extracted pixel are respectively referred to as an edge position coordinate, an edge magnitude, and an edge direction, while an image having the edge position coordinate, the edge magnitude, and the edge direction is referred to as an edge image.

Figure 5C:
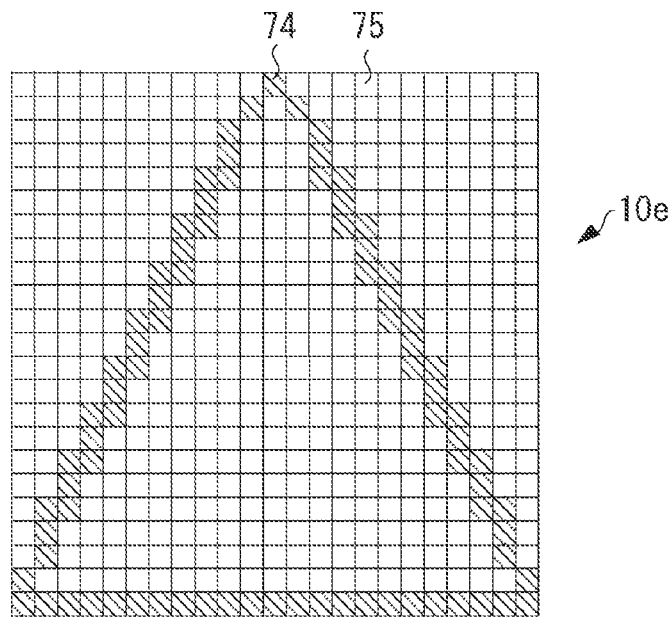

In order to store data of the model edge image 10e, a two-channel data region is provided for each of the pixels in the image. Then, as illustrated in FIG. 5C, pixels 74 having the edge magnitude equal to or greater than the threshold value, indicated by a hatched region in the model edge image 10e, are regarded as effective pixels, so that values of the edge magnitude and the edge direction are stored in the first and the second channels respectively. On the other hand, pixels 75 having the edge magnitude less than the threshold value, illustrated in white color in FIG. 5C, are regarded as non-effective pixels, so that invalid values (such as "0") are stored therein. In the present exemplary embodiment, although the two-channel data region is provided for each of the pixels, the configuration is not limited to the above. For example, two images such as an edge magnitude image that stores only the edge magnitude and an edge direction image that stores only the edge direction may make a pair to store the data. Further, three images such as an edge magnitude image that stores only the edge magnitude, an X-direction edge magnitude image that stores only the X-direction edge magnitude, and a Y-direction edge magnitude image that stores only the Y-direction edge magnitude may make a pair to store the data. Furthermore, in the present exemplary embodiment, the Sobel filter is used in order to calculate the edge magnitude and the edge direction. However, the configuration is not limited thereto, and an edge extraction filter such as the Canny filter may be used therefor.

Subsequently, with reference to the flowchart illustrated in FIG. 6, description will be given of the processing for generating the final model edge image based on the original model edge image (i.e., captured model image 11). The processing illustrated in FIG. 6 corresponds to an image processing method characterized by a model edge image generation method. First, in step S20, the model edge image generation unit 55 inputs the generated original model edge image 10e to the RAM 51. In step S21, the model edge image generation unit 55 captures the captured model image 11 including the work 6 with the camera 4 and inputs the captured model image 11 to the RAM 51. Herein, taking a search image 12 that is to be input thereto in the pattern matching into consideration, it is preferable that the captured model image 11 be an image influenced by the noise such as dust or dirt adhering thereto, variations in illumination, and individual variability. Alternatively, instead of using the image captured by the camera 4 as it is, an artificial edge or artificial noise may be added thereto.

In step S22, by employing the same edge extraction method described in step S13, the model edge image generation unit 55 generates the captured model edge image 11e from the captured model image 11. In step S23, the model edge image generation unit 55 executes the pattern matching of the original model edge image 10e and the captured model edge image 11e.

Herein, processing of the pattern matching executed in step S23 will be described in detail with reference to the flowchart (i.e., subroutine) illustrated in FIG. 7.

Figure 8:
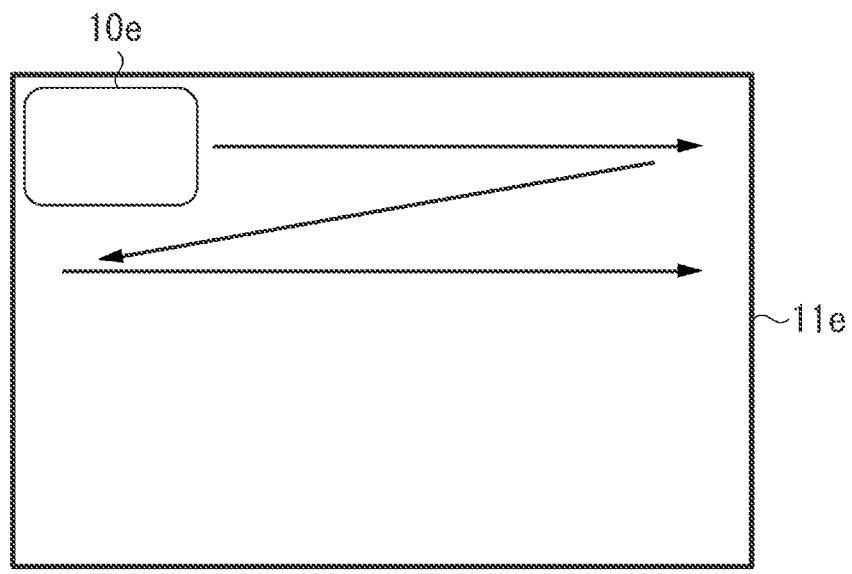
FIG. 8 is a diagram illustrating a captured model edge image according to a present exemplary embodiment.

First, in step S30, the model edge image generation unit 55 sets a detection position for matching the pattern of the model edge image 10e across the entire region within the captured model edge image 11e in a pixel unit (see FIG. 8). In the present exemplary embodiment, as illustrated in FIG. 8, the upper left end position in the captured model edge image 11e is set as a first detection position. Then, the detection position is sequentially moved and set in an order from the upper left to the upper right end position. Thereafter, the detection position is brought down by one pixel and sequentially set in an order from the left end position to the right end position. Then, in step S31, the model edge image generation unit 55 calculates a score at each detection position. In the present exemplary embodiment, a score $S_{ij}$ at an optional detection position (i, j) is calculated by the following formula 3.

$$S_{ij} = \frac{1}{N} \sum_{k=0}^{N-1} s_k \qquad \text{<Formula 3>}$$

In the above, "$S_{ij}$" represents a score at the detection position (i, j), "N" represents number of edge points in the model edge image 10e, and "$s_k$" represents a local score.

The local score $s_k$ is a score calculated at each edge point of the model edge image 10e, which is a cosine value of a difference between the edge direction of the captured model edge image 11e and the edge direction of the model edge image 10e at one edge point. The local score $s_k$ is calculated by the following formula 4.

$$s_k = \cos(\theta_{Tk} - \theta_{Mk}) \qquad \text{<Formula 4>}$$

In the above, "k" is a value equal to 1 to N (k=1, ..., N), and represents an edge point index of the model edge image 10e, "$\theta_{Tk}$" represents an edge direction of the captured model edge image 11e, and "$\theta_{Mk}$" represents an edge direction of the model edge image 10e.

A range of values the local score $s_k$ can take is −1 to +1. Because a summation of the local scores $s_k$ is normalized after being divided by the number of edge points, a range of values the score $S_{ij}$ can take is also −1 to +1.

In step S32, the model edge image generation unit 55 determines whether the calculated score $S_{ij}$ is equal to or greater than a predetermined threshold value. In a case where the model edge image generation unit 55 determines that the calculated score $S_{ij}$ is equal to or greater than a predetermined threshold value (YES in step S32), the processing proceeds to step S33. In step S33, the model edge image generation unit 55 sets the detection position as a matching candidate point, and stores the detection position (i, j), the score $S_{ij}$, and the local scores $s_k$ at respective edge points. After the matching candidate point is set in step S33, or in a case where the model edge image generation unit 55 determines that the score $S_{ij}$ is not equal to or greater than a predetermined threshold value (NO in step S32), the processing proceeds to step S34. In step S34, the model edge image generation unit 55 determines whether calculation of the score $S_{ij}$ has been completed for all of the detection positions.

In a case where the model edge image generation unit 55 determines that calculation of the score $S_{ij}$ has not been completed for all of the detection positions (NO in step S34), the processing returns to step S30 so that the model edge image generation unit 55 calculates the score $S_{ij}$ again by setting the next detection position through the processing in steps S30 to S33. In a case where the model edge image generation unit 55 determines that calculation of the score $S_{ij}$ has been completed for all of the detection positions (YES in step S34), the processing proceeds to step S35. In step S35, the model edge image generation unit 55 outputs information of a matching candidate point having the greatest score $S_{ij}$ from among the matching candidate points. Specifically, the model edge image generation unit 55 outputs the information such as the detection position (i, j), the score $S_{ij}$, and the local scores $s_k$ at respective edge points of the matching candidate point. Then, the model edge image generation unit 55 returns the processing to the original routine, so that the processing proceeds to step S24 in FIG.

6. If the matching candidate point does not exist, the processing in step S35 will not be executed.

As illustrated in FIG. 6, in step S24, the model edge image generation unit 55 stores the local scores $s_k$ at respective edge points output in step S35. Through the above-described processing in steps S21 to S24, a set of local scores $s_k$ at respective edge points can be acquired with respect to a single captured model image 11. In other words, according to the present exemplary embodiment, the local scores $s_k$ correspond to the similarity at respective edge points in the model edge image 10e in the pattern matching of the captured model edge image 11e and the model edge image 10e.

Then, in step S25, the model edge image generation unit 55 determines whether the processing for acquiring the local scores sk at respective edge points has been completed for all of the captured model images 11. Herein, it is preferable that the processing be executed on the captured model images 11 of a statistically reliable number. In a case where the model edge image generation unit 55 determines that the processing has not been completed for all of the captured model images 11 (NO in step S25), the processing is executed from step S21 again.

In a case where the model edge image generation unit 55 determines that the processing has been completed for all of the captured model images 11 (YES in step S25), the processing proceeds to step S26. In step S26, the model edge image generation unit 55 selects the edge point that is to be eliminated from the original model edge image 10e. In the present exemplary embodiment, the elimination-target edge point is selected from among the edge points in the model edge image 10e based on the local score $s_k$ (i.e., similarity).

Figure 9:
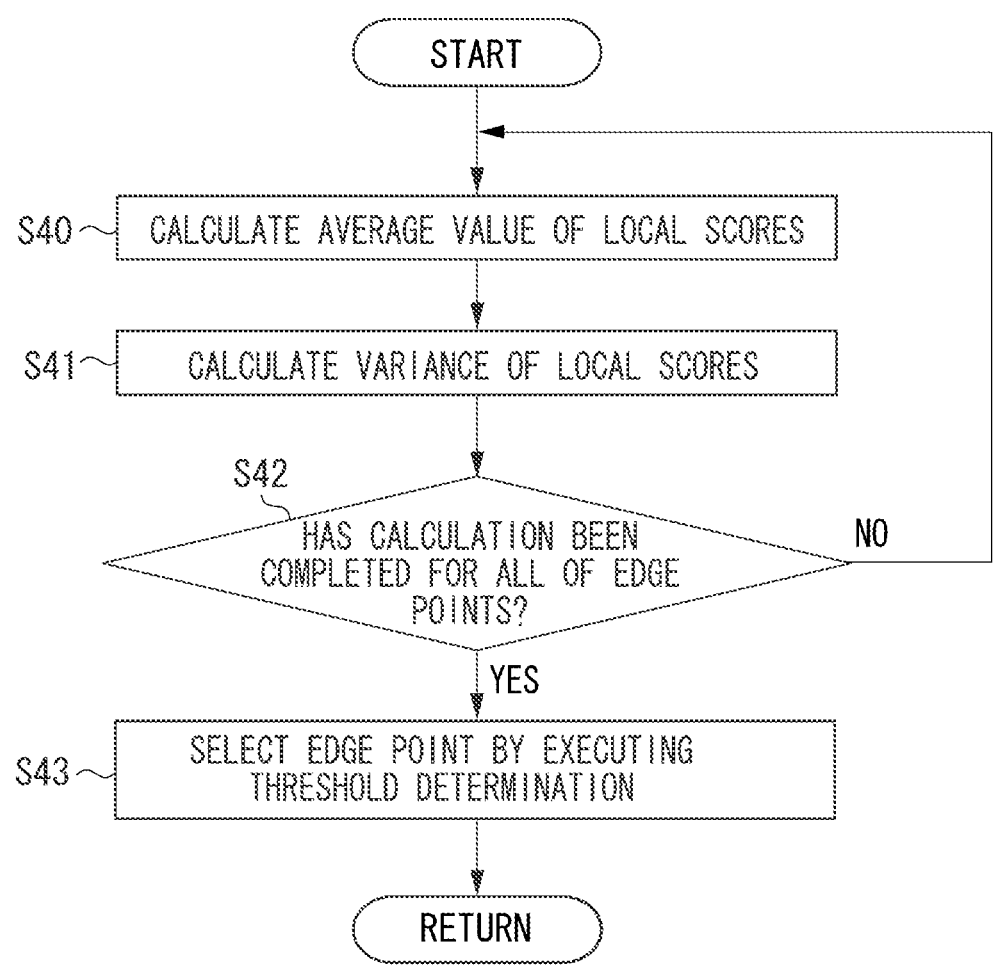
FIG. 9 is a flowchart illustrating the processing for selecting an edge point that is to be executed when a model edge image is generated by the model edge image generation unit according to a present exemplary embodiment.

Herein, processing for selecting the edge point executed in step S26 will be described in detail with reference to the flowchart (i.e., subroutine) illustrated in FIG. 9.

First, in step S40, the model edge image generation unit 55 calculates the average of the local scores $s_k$ at respective edge points in the original model edge image 10e. In the present exemplary embodiment, it is assumed that the local scores $s_k$ for M-piece of the captured model images 11 are acquired through the processing executed in steps S21 to S25. Then, a repetitive processing index L for M-piece of the captured model images 11 is assumed to be a value equal to 1 to M (L=1, ..., M). At this time, if the local scores $s_{Lk}$ are taken out by making the edge point index k of the original model edge image 10e as a reference, an average $m_k$ of the local scores $s_{Lk}$ at respective edge points is calculated by the following formula 5.

$$m_k = \frac{\sum_{L=1}^{M} s_{LK}}{M} \qquad \text{<Formula 5>}$$

In the above, the edge point index k is a value equal to 1 to N (k=1, ..., N).

In other words, calculation of the average $m_k$ of the local scores $s_{Lk}$ at one edge point is executed as much as the number of edge points. Similarly, in step S41, a variance $\sigma_k^2$ of the local scores $s_{Lk}$ at respective edge points can be calculated by the following formula 6.

$$\sigma_k^2 = \frac{1}{M} \sum_{L=1}^{M} (s_{LK} - m_k)^2 \qquad \text{<Formula 6>}$$

In the above, the edge point index k is a value equal to 1 to M (k=1, ..., M).

For example, in a case where one edge point is influenced by the noise discontinuously changing in a time direction, the average $m_k$ of the local scores $s_{Lk}$ at the one edge point calculated by the formula 5 has a small value while the variance $\sigma_k^2$ thereof has a large value. In other words, according to the values of the average $m_k$ and the variance $\sigma_k^2$, the model edge image generation unit 55 can select the edge point by eliminating the edge point easily influenced by the noise.

Then, in step S42, the model edge image generation unit 55 determines whether calculation of the average $m_k$ and the variance $\sigma_k^2$ has been completed for all of the edge points. In a case where the model edge image generation unit 55 determines that the calculation thereof has not been completed for all of the edge points (NO in step S42), the processing returns to step S40 so that the model edge image generation unit 55 executes the calculation for the next edge point through the processing in steps S40 to S41. In a case where the model edge image generation unit 55 determines that the calculation thereof has been completed for all of the edge points (YES in step S42), the processing proceeds to step S43. In step S43, the model edge image generation unit 55 selects the edge point by executing threshold determination based on the calculated average $m_k$ and the variance $\sigma_k^2$.

In the present exemplary embodiment, the model edge image generation unit 55 selects the elimination-target edge point based on at least one of the average $m_k$ and the variance $\sigma_k^2$ of the local scores $s_{Lk}$ (i.e., similarity) with the model edge image 10e at the respective edge points of a plurality of captured model edge images 11e. Herein, the model edge image generation unit 55 previously sets the threshold values with respect to the average $m_k$ and the variance $\sigma_k^2$, and determines and selects the edge point based on the threshold values. Specifically, when the average $m_k$ has a value equal to or less than the set threshold value, or when the variance $\sigma_k^2$ has a value equal to or greater than the set threshold value, the model edge image generation unit 55 determines that the edge point is influenced by the noise, and eliminates that edge point. Alternatively, instead of using the threshold values, for example, the model edge image generation unit 55 may sort the averages $m_k$ of the local scores $s_{Lk}$ at respective edge points in an descending order while sorting the variances $\sigma_k^2$ thereof in an ascending order, and eliminate an optional percentage (e.g., 20%) of the edge points from the lowest order. Then, the model edge image generation unit 55 returns the processing to the original routine, so that the processing proceeds to step S27 in FIG. 6.

As illustrated in FIG. 6, in step S27, the model edge image generation unit 55 eliminates the selected elimination-target edge point from the original model edge image 10e to generate the final model edge image. Then, the pattern matching unit 56 uses the generated final model edge image to execute the pattern matching of the final model edge image and the search edge image 12e through the processing described in step S6.

As described above, the control device 5 according to the present exemplary embodiment selects the edge point to be eliminated based on the local score $s_{Lk}$ from among the edge points in the model edge image 10e and generates an edge image acquired by eliminating the selected edge point as the final model edge image. Therefore, even if the work 6 has a different surface condition because of the influence of various kinds of noise, the detection accuracy of the work 6 can be suppressed from being lowered. Further, the pattern matching of the final model edge image and the search edge image 12e can be executed with high accuracy by suppressing the lowering of detection accuracy of the work 6.

In the above-described control device 5 according to the present exemplary embodiment, a final model edge has been generated and pattern matching is executed by using the final model edge. However, the present exemplary embodiment is not limited to the above. For example, the generated model edge image 10e may be registered on a library.

The respective processing operations of the above-described present exemplary embodiment are specifically executed by the model edge image generation unit 55 and the pattern matching unit 56. Accordingly, a storage medium storing a program of software that realizes the above-described functions may be supplied to the model edge image generation unit 55 and the pattern matching unit 56. Then, the CPU 50 constituting the model edge image generation unit 55 may read and execute the model edge image generation program 52a stored in the storage medium to achieve the functions. Alternatively, the CPU 50 constituting the pattern matching unit 56 may read and execute the pattern matching program 52b stored in the storage medium in order to achieve the functions. In such a case, a program itself that is read from the storage medium realizes the functions of the above-described exemplary embodiments, and thus the program itself and the storage medium storing that program configure the present invention.

Further, according to a configuration described in the present exemplary embodiment, a computer readable storage medium serves as the ROM 52, and the model edge image generation program 52a and the pattern matching program 52b are stored in the ROM 52. However, the configuration is not limited to the above. The above-described programs can be stored in a computer readable storage medium of any type. For example, a hard disk drive (HDD), an external storage device, or a storage disk may be employed as the storage medium for supplying the programs.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-211412, filed Oct. 16, 2014, which is hereby incorporated by reference herein in its entirety.

What is claimed is:

1. An image processing method comprising:
generating a plurality of captured model edge images by executing edge extraction processing on a plurality of captured model images acquired by capturing a target object;
executing pattern matching of the captured model edge images and a model edge image related to the detection target object;
calculating similarity at respective edge points in the model edge image;
calculating a variance and an average of the similarity at the edge points in the model edge image in relation to the captured model edge images respectively;
eliminating an edge point from the model edge image based on at least one of the average and the variance not to use the edge point for the pattern matching.

2. The image processing method according to claim 1, wherein, in the eliminating, an edge point for which the variance is not less than a predetermined value or for which the average is not greater than a predetermined value is eliminated from the model edge image.

3. The image processing method according to claim 1, wherein, in the eliminating, among all edge points, some edge points that are included in a predetermined percentage in terms of the variance in a descending order or are included in a predetermined percentage in terms of the average in an ascending order are eliminated from the model edge image.

4. A method for generating an edge image that includes a plurality of edge points, comprising:
acquiring a plurality of images by capturing a target object;
extracting edges from the plurality of images;
calculating a variance of similarity between corresponding edge points of the edges extracted from the plurality of images; and
generating an edge image while leaving edge points for which the variance satisfies a predetermined condition and while eliminating edge points for which the variance does not satisfy the predetermined condition.

5. The method according to claim 4,
wherein edge points that are included in a predetermined percentage in terms of the variance in an ascending order are eliminated.

6. The method according to claim 4, wherein after the edge image is generated, patter matching is executed using the generated edge image.

7. A non-transitory computer readable storage medium storing a program for causing a computer to implement the method comprising:
acquiring a plurality of images by capturing a target object;
extracting edges from the plurality of images;

calculating a variance of similarity between corresponding edge points of the edges extracted from the plurality of images; and generating an edge image while leaving edge points for which the variance satisfies a predetermined condition and while eliminating edge points for which the variance does not satisfy the predetermined condition.

8. The non-transitory computer readable storage medium according to claim 7, wherein after the edge image is generated, patter matching is executed using the generated edge image.

9. A system, comprising:
an image processing apparatus configured to execute
acquiring a plurality of images by capturing a target object,
extracting edges from the plurality of images,
calculating a variance of similarity between corresponding edge points of the edges extracted from the plurality of images, and
generating an edge image for pattern matching while leaving edge points for which the variance satisfies a predetermined condition and while eliminating edge points for which the variance does not satisfy the predetermined condition; and
a storage configured to store the generated edge image for the pattern matching.

10. The system according to claim 9, further comprising:
a camera,
wherein the plurality of images is acquired by means of the camera.

11. The system according to claim 10, wherein the image processing apparatus executes the pattern matching using the image acquired by means of the camera and using the edge image for the pattern matching.

12. The system according to claim 11, further comprising:
a robot body configured to be able to perform work on the target object; and
a controller configured to control the robot body,
wherein the controller controls the robot body on a basis of a result of the pattern matching.

13. The system according to claim 9, wherein after the edge image is generated, patter matching is executed using the generated edge image.

14. A method for controlling a system, comprising:
acquiring a plurality of images by capturing a target object;
extracting edges from the plurality of images;
calculating a variance of similarity between corresponding edge points of the edges extracted from the plurality of images;
generating an edge image for pattern matching while leaving edge points for which the variance satisfies a predetermined condition and while eliminating edge points for which the variance does not satisfy the predetermined condition; and
storing the generated edge image for the pattern matching.

15. The method according to claim 14, wherein edge points that are included in a predetermined percentage in terms of the variance in an ascending order are eliminated.

16. The method according to claim 14, further comprising:
detecting a position or an orientation of the target object, or both the position and the orientation, using the edge image for the pattern matching.

17. The method according to claim 14, wherein after the edge image is generated, patter matching is executed using the generated edge image.

* * * * *